United States Patent Office 2,971,933
Patented Feb. 14, 1961

2,971,933

HEAT-HARDENING PLASTIC COMPOSITION

Carl L. Beal, Huntington, N.Y.
(42 Kendrick Lane, Huntington Station, N.Y.)

No Drawing. Filed July 5, 1957, Ser. No. 669,919

11 Claims. (Cl. 260—23)

This invention relates to heat-hardening plastic compositions for use in connection with rotational and/or gyrational casting and more particularly to such compositions as will produce hollow plastic articles having high tensile strength and at the same time toughness and high impact resistance.

An object of this invention is to provide a flowable heat-hardening plastic composition useful in the so-called gyrational casting and capable of being distributed more or less uniformly over the entire inner surfaces of a closed mold and, further, capable of being hardened in heat transferred through the walls of the mold to prouce a tough rigid resilient plastic of medium hardness and of superior strength.

A further object of this invention is to provide a heat-hardening plastic composition of the flowable distributable type which may be placed in a high heel mold in quantities less than that needed to fill the mold, and upon gyrational movements and heating of the mold produce a high heel for ladies' shoes with an integral wall structure defining a hollow space, said wall structure being a tough, rigid, resilient plastic of medium hardness and high impact resistance, and capable of meeting the severe service requirements essential to slim, high hollow plastic heels for ladies' shoes, such as are described in my prior copending application, Ser. No. 637,463, filed January 31, 1957, and issued on December 29, 1959, as U.S. Patent No. 2,918,736, as well as to other types of hollow plastic articles.

Other objects of this invention will be apparent from the following specification, it being understood that changes, variations and modifications may be included in the constituents of the heat-hardening plastic compositions of this application within the scope of the invention as hereinafter described and claimed.

It has heretofore been proposed to make hollow plastic articles by the inclusion in a hollow mold of smaller quantities of a heat-hardening plastic composition than is necessary to fill the mold so that as the mold is gyrated the initially flowable plastic composition within the mold will be more or less uniformly distributed over the entire inner surface of the mold and during the gyration the heat-hardening plastic composition will be hardened by a physio-chemical action which is facilitated by heat transferred through the walls of the mold and thus to form a hollow solid plastic article.

The flowable plastic compositions of this invention may be fluids of sufficiently low viscosity to flow freely at room temperatures, or they may be flowable compositions of higher viscosity that will flow under the temperature conditions existing in the mold in the early part of the heating cycle. It is sufficient that the composition be of such fluidity that it will distribute itself uniformly over the inner surface of the mold during the gyrating and heating cycle and will react to produce an article of satisfactory physical properties such as have been hereinabove indicated. For convenience, the flowable plastic compositions of this application are sometimes generically referred to as "rigisols."

A flowable heat-hardening plastic composition of the following General Formula is illustrative of the invention of this application, the constituents (1) to (4) being basic constituents and the constituents (5) to (7) being ancillary constituents of such a flowable plastic composition:

GENERAL FORMULA

| Constituents | Parts by Weight |
|---|---|
| (1) High molecular weight dispersion-type polyvinyl chloride resin | 100 |
| (2) Liquid disperant, such as polymerizable acrylic monomer | 25–75 |
| (3) Plasticizer, such as didecyl phthalate | 5–25 |
| (4) Catalyst, such as 40% dicumyl peroxide on precipitated $CaCO_3$ | 2–5 |
| (5) Colorant, finely divided solid pigment, dispersed in plasticizer, as 10% carbon black in dioctyl phthalate | 0–10 |
| (6) Fluid polyamide resin which is the reaction product of a polymeric fat acid with an aliphatic polyamine, the reaction product having the formula<br><br>$$HO(-OC-R-CONH-R'-NH)_nH \quad (A)$$<br><br>wherein R represents a hydrocarbon radical, R' is an aliphatic hydrocarbon radical and $n$ represents the number of condensed molecules | 7–25 |
| (7) Epoxy-type resin which is the polymeric reaction product of a polyfunctional halohydrin with a polyhydric phenol and which reaction product has the formula<br><br>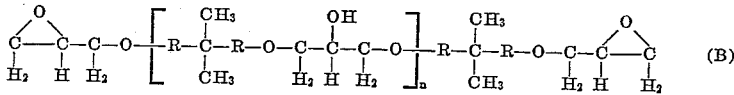<br><br>wherein R represents the divalent phenyl radical, and $n$ represents the number of molecules condensed. See page 106 of Modern Plastics—Encylopedia Issue, September 1956, published by Breskin Publications, 575 Madison Ave., New York, N.Y., wherein it is stated that $n$ varies between 0 and 10 and that the major portion of the epoxy resin of Formula B is the diglycidyl ether of bisphenol A [2,2-bis(4-hydroxyphenyl)alkane] wherein $n$ of the Formula B is zero | 5–20 |

The constituents of the above General Formula are thoroughly intermixed by stirring and/or grinding. The resulting composition is a flowable plastic composition of relatively low viscosity capable of being converted by heat and/or chemical action into a rigid plastic or rigisol.

It is to be understood that wide variations in proportions of the above constituents may be made and that similar specific constituents may be substituted for those enumerated above, all without departing from the scope and spirit of the invention of this application.

By way of amplification, the constituents of the above General Formula are more fully described in the following paragraphs which are numbered to correspond with the numbers appearing before the constituents in the above General Formula.

(1) The high molecular weight dispersion-type polyvinyl chlorides, which have been found satisfactory in carrying out the invention of this application, are finely divided or minute particle sized resins, such as are produced by the polymerization of vinyl chloride in aqueous emulsion, the particle sizes of the polyvinyl chloride resins preferably ranging for the most part from about 0.1 to about 10.0 microns. Thus, a high molecular weight polyvinyl chloride resin, marketed by B. F. Goodrich Chemical Company as Geon Vinyl Resin 121, a dispersion-type resin having a particle size ranging from about 0.1 to about 1.3 microns, or a dispersion-type high molecular weight polyvinyl resin marketed by Naugatuck Chemical Company as Marvinol Vinyl Resin VR–10, having an average particle size for the most part of less than 10 microns, generally of an average size in the neighborhood of from about 6 to about 7 microns. It has been found to be preferable to use a mixture of two or more dispersion-type polyvinyl resins in varying proportions, since a mixture of the relatively large and relatively small particle sizes of different dispersion-type resins gives a lower viscosity to the flowable heat-hardening plastic composition. In practice, equal parts of Geon Vinyl Resin 121 and of Marvinol Vinyl Resin VR–10 have given satisfactory results, as have other proportions of these dispersion-type resins. It is to be also understood that other makes of the dispersion-type high molecular weight polyvinyl resins also may be employed, such as Bakelite QYNV, Exon 654, Marvinol VR–50, and the like.

(2) The liquid dispersant is a polymerizable monomer capable of being hardened by heat and/or chemical action to a solid resin, the dispersion-type polyvinyl resin being first dispersed in the liquid dispersant, with other constituents, and then hardened by heat and/or chemical action. The dispersant is preferably a polymerizable acrylic monomer, preferably a methacrylate diester of an ethylene glycol, such as triethylene glycol dimethacrylate, marketed by Specialty Resins, Inc., as Monomer SR #205, or ethylene glycol dimethacrylate, marketed by The Borden Company, as EGD, or a commercial acrylic monomer marketed by Carbide and Carbon Corporation under the trade name MG–1, comprising chiefly diethylene glycol dimethacrylate, and having a viscosity of 12.2 centipoises at 25° C., a specific gravity at 25° C. of 1.078, and a refractive index at 30° C. of 1.459, or other like dispersants. The proportions of the liquid dispersant to the polyvinyl chloride resins may vary widely. Thus, as little as 25% and as high as 75% of the liquid dispersant have been satisfactorily employed, but normally 35% to 50% of the liquid dispersant give satisfactory results. Where volatility is not an important factor in the hardening process, a portion of the above liquid dispersants may be replaced with n-butyl methacrylate, at some savings in cost. Thus, 5 to 20 parts of n-butyl methacrylate may replace equal parts of any of the above named liquid dispersants, such as MG–1.

(3) The plasticizer may also be chosen from a variety of plasticizers known to plasticize high molecular weight polyvinyl chloride resins, as di(2-ethylhexyl)phthalate, didecyl phthalate, dicapryl phthalate, dioctyl phthalate, dioctyl sebacate, di(2-ethylhexyl)succinate, dimethylcyclohexyl phthalate, and like plasticizers for polyvinyl chloride resins, many of which are described on pages 358 to 361 of Modern Plastics, Encyclopedia Issue, September 1956, supra.

(4) The catalyst may likewise be any one of the recognized catalysts capable of facilitating the polymerization of the acrylic monomer liquid dispersant by heat and/or chemical action to a solid polymer, such catalysts including dicumyl peroxide, benzoyl peroxide, acetyl peroxide, lauroyl peroxide and the like.

(5) The colorant may be omitted, but it is generally present. It is preferably a finely divided solid pigment dispersed in any of the above indicated plasticizers in master batch form. Any of the solid pigments normally used in industry for coloring polyvinyl resin plastics may be used, including the reinforcing and extending pigments, such as finely divided carbon blacks, titanium dioxide, methyl amino anthracine (Indo Red), carbethyoxy pyrazolone (Red), phthalocyanine green, benzidene yellow, indanthrene blue, and other commercial pigments, such as are enumerated in pages 345 to 347 of Modern Plastics, Encyclopedia Issue, September 1956, supra. The pigment in the master batch may vary from 5% to 90% the weight of the plasticizer but generally a master batch of from 5% to 25% is preferable.

The above named five constituents are disclosed in applicant's earlier application, Serial No. 637,463, now Patent No. 2,918,736, and produce satisfactory flowable heat-hardening plastic compositions, which compositions are herein sometimes referred to as the basic high molecular weight dispersion-type polyvinyl chloride heat-hardening plastic compositions, or, in the interest of brevity, the basic polyvinyl chloride plastic compositions.

As a result of extensive researches and tests, applicant has more recently discovered that greater resilience, toughness, tensile and impact resistance, very important properties in hollow molded plastic products, can be imparted to the hardened polyvinyl plastic compositions by the addition to the basic plastic compositions of two other constituents, with the result that a markedly superior, outstanding rigid solid plastic product is obtained. These other constituents are numbered (6) and (7) above, and are hereinbelow more fully described.

(6) The fluid polyamide resins employed in the invention of this application are reaction products of polymeric fat acids with aliphatic polyamines, thus $n\text{HOOC}-\text{R}-\text{COOH}+n\text{H}_2\text{N}-\text{R}'-\text{NH}_2$

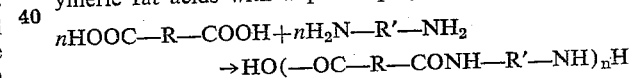

wherein R represents either an aliphatic or a ring-type hydrocarbon radical, R' represents an aliphatic hydrocarbon radical, and $n$ represents the number of fat acid and polyamine molecules condensed in the resulting polyamide resins, which vary widely in the different fluid polyamide resins of this application. The aliphatic polyamines include ethylene diamine, diethylene triamine, triethylene tetramine, tetraethylene pentamine, 1,4-diaminobutane, hexamethylene diamine, 3-(N-isopropylamino)propylamine, 3,3'-imino-bispropylamine, and the like. The polymeric fat acids include polymerization products of drying oils and semi-drying oils, such as soybean, linseed, tung, perilla, cotton seed, corn, sunflower, dehydrated castor oil and the like. The term "polymeric fat acid" as herein employed includes the polymerized mixture of fat acids, containing a predominant proportion of dimeric, trimeric and higher polymeric acids and some residual monomer.

The fluid polyamide resins employed in the invention of this application are generally flowable at temperatures higher than 60° C. and are characterized by having an amine value ranging from about 85 to about 320 and a viscosity ranging from about 80 to about 1000 poises, as determined in a Brookfield viscometer with a #6 spindle rotating at 4 r.p.m. with the fluid polyamide resins at 40° C. Preferably, the fluid polyamide resins have an amine value of about 210 to 320 and a viscosity ranging from about 80 to about 750 poises, but a fluid polyamide resin having an amine value and a viscosity within the above stated wider limits may also be employed with satisfactory results. Suitable fluid polyamide resins for the purpose of this invention are marketed by the Chemical Division of General Mills Inc. under the trade names "Versamid 115" and "Versamid 125."

(7) The epoxy-type resins employed in the invention of this application preferably have a viscosity ranging from 7,200 to 19,500 centipoises and are of the structural formula above set out in formula (B) supra. Such epoxy-type resins are polymeric reaction products of polyfunctional halohydrins with polyhydric phenols. Typical polyfunctional halohydrins are epichlorohydrin, glycerol dichlorohydrin and the like. Typical polyhydric phenols are resorcinol and a 2,2-bis(4-hydroxyphenyl)alkane, the latter resulting from the condensation of phenols with aldehydes and ketones, including formaldehyde, acetaldehyde, propionaldehyde, acetone, methyl ethyl ketone and the like, which result in such compounds as 2,2-bis(4-hydroxyphenyl)propane and like compounds. These epoxy-type resins normally contain terminal epoxy groups, but may contain terminal epoxy groups and terminal primary hydroxyl groups. These epoxy-type resins are marketed by the Bakelite Company under the trade names "ERL 2774" and "ERL 3794." Similar reaction products of the epoxy-type here described are marketed by other companies as "epoxy-type resins," such as Shell Epon 820 and 828, Ciba Araldite 6010 and 6020. A reactive diluent, such as allyl glycidyl ether, butyl glycidyl ether, phenyl glycidyl ether, styrene oxide, octylene oxide, and like reactive compounds, are sometimes added to the epoxy-type resin in amounts up to 20 parts of the liquid diluent to 100 parts of the epoxy-type resin. Modified epoxy-type resins, diluted with such reactive monomers, are commercially available. For example, Bakelite ERL–2795 is a modified epoxy-type resin having a viscosity of from 500 to 900 centipoises; Araldite 502, a modified epoxy-type resin having a viscosity of from 3,000 to 6,000 centipoises; and Epon 815, a modified epoxy-type resin having a viscosity of from 500 to 900 centipoises. These modified epoxy-type resins are operative in the invention of this application. The term epoxy resin is herein employed to include both the epoxy-type resins first hereinabove described and also the above noted modified epoxy-type resins. See pages 105–109 of Modern Plastics, Encyclopedia Issue, September 1956, supra.

By the inclusion in the above mentioned basic polyvinyl chloride plastic compositions of these two constituents, namely, the fluid polyamide resins and the epoxy resins hereinabove described, markedly superior rigid hardened plastic products are obtained.

It will be appreciated that other constituents commonly used in plastic compositions may be added to the above indicated compositions without departing from the spirit or scope of the invention of this application. Thus a stabilizer may be added in small percentages, ranging from 1% to 10% by weight on the polyvinyl chloride resin, such as for example, lead silicate, di-basic lead phthalate, barium recinoleate, or other known stabilizers, some of which are described on pages 354-357 of Modern Plastics, Encyclopedia Issue, September 1956, supra.

Other modifiers may be employed. The polyester alkyd resin, commercially marketed under the trade name "Atlac 382" and like alkyd resins, may be advantageously employed in a range from 2% to 10% by weight on the polyvinyl chloride resin, where low shrinkage, excellent surface characteristics and greater flexibility of the finished products are desired. See pages 138 to 143 of Modern Plastics, Encyclopedia Issue, September 1956, supra.

The above indicated flowable plastic compositions are effectively converted to a hard, tough, strong, impact-resistant product of homogenous structure having various degrees of hardness.

As will be understood by one skilled in the art, the initial flowable plastic compositions within the scope of the above General Formula may be modified to produce a softer finished hardened plastic article by (a) Increasing the plasticizer to from 15 to 25 or more parts;

(b) Increasing the fluid polyamide resin to from 15 to 25 or more parts; or (c) Decreasing the epoxy-type resin from 10 to 5 or less parts.

On the other hand, the initial flowable plastic compositions within the scope of the above General Formula can be modified to produce a harder finished hardened plastic article by:

(a) Increasing the liquid dispersant to from 50 to 75 or more parts;

(b) Increasing the epoxy-type resin to from 15 to 20 or more parts; or (c) Decreasing the fluid polyamide resin to from 15 to 7 or less parts.

*Example I*

As illustrative of the utility of the flowable hardening plastic compositions comprising the basic constituents of the above General Formula, a shoe heel composition is made up containing 100 parts of a dispersion-type high molecular weight polyvinyl chloride resin having particle sizes ranging for the most part between 0.1 and 10.0 microns;

45 parts of triethylene glycol dimethacrylate, such as Monomer SR #205, as a liquid dispersant;

15 parts of didecyl phthalate as a plasticizer;

4 parts of 40% dicumyl peroxide precipitated on calcium carbonate as a catalyst;

12 parts of a flowable polyamide resin comprising the reaction product of a polymeric linseed oil and ethylene diamine;

10 parts of an epoxy-type resin comprising the reaction product of epichlorohydrin and a 2,2-bis(4-hydroxyphenyl) propane; and 5 parts of 10% carbon black dispersed in didecyl phthalate as a colorant.

All parts are by weight.

The constituents of this composition are thoroughly and intimately intermixed, a moderate heat being applied if desired to hasten the mixing, to produce a flowable plastic composition suitable for the manufacture of hollow plastic heels for ladies' shoes.

The above flowable plastic composition is introduced into a shoe heel mold, the amount of the composition being less than required to fill the mold but sufficient to give strong wall structures to the converted plastic contiguous the inner walls of the mold. The mold is closed and is then heated and gyrated so as to distribute the flowable plastic inside the mold more or less uniformly over all the inner surfaces of the mold. The gyration is accompanied by heating of the mold, the heat being transferred through the walls of the mold to the flowable plastic composition, distributed over the inner wall surfaces of the mold, and there converted to a tough rigid heat-hardened solid. The mold is first cooled and then the cast heel is removed. Tests show the heel to be of excellent quality, as proven by the service tests.

*Example II*

As another example illustrative of the utility of the flowable heat-hardening plastic composition indicated in the above General Formula, a heel composition is made up containing 50 parts of a high molecular weight dispersion-type polyvinyl chloride resin having relatively small particle sizes ranging from about 0.1 to 1.3 microns, such as Geon Vinyl Resin 121;

50 parts of a high molecular weight dispersion-type polyvinyl chloride resin having larger particle sizes averaging about 6 to 7 microns, such as Marvinol Vinyl Resin VR–10;

40 parts of triethylene glycol dimethacrylate, as a liquid dispersant;

7 parts of didecyl phthalate, as a plasticizer;

2.5 parts of 40% dicumyl peroxide on precipitated calcium carbonate, as a catalyst;

3 parts of a 10% carbon black dispersion in dioctyl phthalate, as a colorant;

3 parts of lead phthalate, as a stabilizer;

15 parts of a fluid polyamide resin comprising the condensation products of polymerized linoleic acid and polyamines, having a viscosity of 80–120 poises at 40° C., in a Brookfield Viscometer with a #6 spindle rotating at 4 r.p.m., such as Versamid 125; and 10 parts of an epoxy-type resin of a viscosity ranging from 10,500 to 19,500 centipoises, such as Bakelite ERL 2774.

The above-enumerated constituents in the amounts specified are thoroughly and intimately intermixed to produce a homogeneous flowable plastic composition within the scope of the invention of this application.

The flowable plastic composition thus produced is tested by producing from it a heel in the manner above described in connection with Example I. The heel produced from the plastic composition of Example II was tougher and had a higher tensile strength and a higher impact resistance than the heel produced from the plastic composition of Example I, although both heels exhibited superior properties and are of high commercial quality.

*Example III*

A flowable heat-hardening heel composition is made up containing:

40 parts of a high molecular weight dispersion-type polyvinyl chloride resin having for the most part relatively small particle sizes ranging from about 0.1 to about 1.3 microns;

60 parts of a high molecular weight dispersion-type polyvinyl chloride resin having for the most part larger particle sizes averaging from about 6 to 7 microns;

50 parts of triethylene glycol dimethacrylate;

10 parts of dioctyl phthalate;

5 parts of a 40% benzoyl peroxide on precipitated calcium carbonate;

2 parts of 10% carbon black dispersed in didecyl phthalate;

5 parts of lead silicate;

25 parts of the reaction product of polymeric linoleic acid with ethyldiamine;

16 parts of the polymerization product epichlorohydrin and 2,2-bis-(4-hydroxyphenyl)propane; and 2 parts of allyl glycidyl ether.

All parts are by weight.

The above listed constituents are thoroughly and intimately intermixed to produce a homogeneous flowable plastic composition, from which a heel was made in the manner described in connection with Example I. The heel so produced was superior in toughness, high tensile strength and high impact resistance.

It will be understood by those skilled in the art that variations in the amounts of the above indicated constituents may need be made to secure desired physical properties in any finished hardened cast product, and that these variations are within the scope of the men skilled in the art and are such as are normally worked out by experimentation in the production of specific cast products.

What is claimed is:

1. A flowable plastic composition capable of becoming a rigid tough hard solid by heating and suitable for making superior hollow high plastic heels by gyrational casting, which composition comprises 100 parts by weight of a dispersion-type polyvinyl chloride resin of fine particle size ranging for the most part from about 0.1 to 10 microns; 25 to 75 parts by weight of liquid dispersant for said polyvinyl chloride resin containing at least one of the methacrylate diesters of an ethylene glycol selected from the class consisting of ethylene glycol dimethacrylate, diethylene glycol dimethacrylate, triethylene glycol dimethacrylate and tetraethylene glycol dimethacrylate; 2 to 5 parts by weight of a free-radical peroxide catalyst; 12 to 25 parts by weight of a fluid polyamide resin consisting essentially of the reaction product of a fat acid of the formula $n$HOOC—R—COOH with an aliphatic polyamine of the formula $n$H$_2$N—R'—NH$_2$, wherein R is a hydrocarbon radical, R' is an aliphatic hydrocarbon radical, and $n$ is the number of molecules of each of the two reactants forming the polyamide resin; and 10 to 20 parts by weight of an epoxy resin comprising a reaction product of the formula

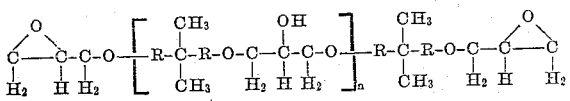

wherein R is a divalent phenylene radical and $n$ is a number ranging from 0 to 10; the above constituents being substantially uniformly and intimately intermixed to produce a flowable plastic composition.

2. A flowable plastic composition as defined in claim 1 in which the liquid dispersant comprises diethylene glycol dimethacrylate.

3. A flowable plastic composition as defined in claim 1 in which the liquid dispersant comprises triethylene glycol dimethacrylate.

4. A flowable plastic composition as defined in claim 1 in which the liquid dispersant comprises ethylene glycol dimethacrylate.

5. A flowable plastic composition as defined in claim 1 in which the fluid polyamide resin is the polymerization product of a fatty acid selected from the class consisting of soybean, linseed, tung, perilla, cottonseed, corn, sunflower and dehydrated castor oils, with an aliphatic polyamine selected from the class consisting of ethylene diamine, diethylene triamine, triethylene tetramine, tetraethylene pentamine, 1,4-diaminobutane, hexamethylene diamine, 3-(N-isopropylamino)propylamine, and 3,3'-imino-bis-propylamine.

6. A flowable plastic composition as defined in claim 1 in which the epoxy resin is the reaction product of a polyhalohydrin selected from the class consisting of epichlorohydrin and glycerol dichlorohydrin and a polyhydric phenol selected from the class consisting of resorcinol and a 2,2-bis(4-hydroxyphenyl)alkane.

7. A flowable plastic composition as defined in claim 1 in which the epoxy resin is the reaction product of a polyhalohydrin selected from the class consisting of epichlorohydrin and glycerol dichlorohydrin and a 2,2-bis-(4-hydroxyphenyl)alkane.

8. A flowable plastic composition as defined in claim 1 in which the epoxy resin is the reaction product of epichlorohydrin and 2,2-bis(4-hydroxyphenyl)propane.

9. A flowable plastic composition as defined in claim 1 in which the epoxy resin is the diglycidyl ether of 2,2-bis(4-hydroxyphenyl)propane.

10. A flowable plastic composition capable of becoming a rigid tough hard solid by heating comprising 100 parts by weight of a dispersion-type polyvinyl chloride resin of fine particle size ranging for the most part from about 0.1 to 10 microns; 25 to 75 parts by weight of liquid dispersant comprising at least one of the methacrylate diesters of an ethylene glycol selected from the class consisting of ethylene glycol dimethacrylate, diethylene glycol dimethacrylate, triethylene glycol dimethacrylate and tetraethylene glycol dimethacrylate; 2 to 5 parts by weight of a free-radical catalyst selected from the class consisting of dicumyl peroxide, benzoyl peroxide, acetyl peroxide and lauroyl peroxide; 5 to 25 parts by weight of a plasticizer for polyvinyl chloride resin; 7 to 50 parts by weight of a fluid polyamide resin which is the reaction product of (a) a fatty acid of an oil selected from the class consisting of soybean, linseed, tung, perilla, cottonseed, corn, sunflower, and castor oils, and (b) a fluid polyamine selected from the class consisting of ethylene diamine, diethylene triamine, triethylene tetramine, tetraethylene pentamine, 1,4-diaminobutane, hexamethylene diamine, 3-(N-isopropylamino)propylamine, and 3,3'-imino-bisproplyamine; and 5 to 50 parts by weight of an epoxy resin which is the reaction product of a polyhalohydrin selected from the class consisting of epichlorohydrin and glycerol dichlorohydrin, and a polyhydric phenol selected from the class consisting of resorcinol and 2,2'-bis(4-hydroxyphenyl)-alkane, the above constituents being substantially uniformly and intimately intermixed to produce a flowable plastic composition.

11. A flowable plastic composition capable of becoming a rigid tough hard solid by heating comprising 100 parts by weight of a high molecular weight dispersion-type polyvinyl chloride resin having from 40 to 60 parts by weight of small particle sizes ranging from about 0.1 to about 1.3 microns and 60 to 40 parts by weight of larger particles having an average particle size for the most part less than 10 microns; 25 to 50 parts by weight of a liquid dispersant for said polyvinyl chloride resins comprising at least one of the methacrylate diesters of an ethylene glycol selected from the class consisting of ethylene glycol dimethacrylate, diethylene glycol dimethacrylate, triethylene glycol dimethacrylate and tetraethylene glycol dimethacrylate; 2 to 5 parts by weight of a free-radical peroxide catalyst; 7 to 25 parts by weight of a fluid polyamide resin having an amine value of from about 85 to about 320 and a viscosity of from about 80 to 1000 poises as determined in a Brookfield viscometer with a #6 spindle rotating at 4 r.p.m. and at 40° C.; and 5 to 20 parts by weight of an epoxy resin of the formula

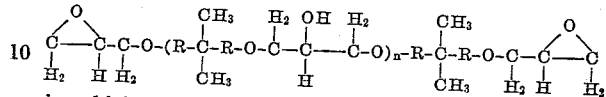

in which R is a divalent phenylene radical and $n$ is a number ranging from 0 to 10; the above constituents being substantially uniformly and intimately intermixed to produce a flowable plastic composition.

References Cited in the file of this patent

UNITED STATES PATENTS

| | | |
|---|---|---|
| 2,618,621 | Burt | Nov. 18, 1952 |
| 2,705,223 | Renfrew et al. | Mar. 29, 1955 |
| 2,773,043 | Zukas | Dec. 4, 1956 |
| 2,843,557 | Safford | July 15, 1958 |

OTHER REFERENCES

Renfrew et al.: Coatings of Polyamide & Epoxy Resin Blends, Ind. & Eng. Chem., pages 2226–2232, vol. 46, No. 10, October 1954.